(12) United States Patent
Radocaj

(10) Patent No.: US 6,941,651 B2
(45) Date of Patent: Sep. 13, 2005

(54) PULLEY AND BEARING ASSEMBLY AND A METHOD AND APPARATUS FOR INSERTING AND FASTENING A BEARING WITHIN A PULLEY

(76) Inventor: Mijo Radocaj, 1912 Amherst Rd., NE., Massillon, OH (US) 44646

( * ) Notice: Subject to any disclaimer, the term of this patent is extended or adjusted under 35 U.S.C. 154(b) by 41 days.

(21) Appl. No.: 10/411,942

(22) Filed: Apr. 12, 2003

(65) Prior Publication Data

US 2004/0200071 A1 Oct. 14, 2004

(51) Int. Cl.[7] ............................................. B21K 1/42
(52) U.S. Cl. ................ 29/892.11; 29/892.1; 29/898.07; 29/509; 29/521; 29/525; 72/374; 72/375; 72/376
(58) Field of Search .................... 72/374, 375, 376, 72/71; 29/892.1, 892.11, 505, 509, 510, 511, 521, 525, 894.361, 894.362, 898.07, 892.2; 474/174, 199

(56) References Cited

U.S. PATENT DOCUMENTS

| | | | | | |
|---|---|---|---|---|---|
| 2,427,072 | A | * | 9/1947 | Rubin | 29/898.07 |
| 2,530,665 | A | * | 11/1950 | Searles | 384/547 |
| 3,335,597 | A | * | 8/1967 | Gobien | 72/377 |
| 3,758,930 | A | | 9/1973 | Frost et al. | |
| 3,828,619 | A | | 8/1974 | Frost et al. | |
| 3,893,818 | A | * | 7/1975 | Mickus | 29/892.2 |
| 3,964,326 | A | * | 6/1976 | Mickus | 474/174 |
| 4,040,281 | A | * | 8/1977 | Meyer | 72/17.2 |
| 4,064,724 | A | * | 12/1977 | Armstrong | 72/108 |
| 4,518,372 | A | * | 5/1985 | Dye | 474/94 |
| 4,767,387 | A | * | 8/1988 | Matsuoka et al. | 474/168 |
| 5,513,819 | A | * | 5/1996 | Orange | 242/610.2 |
| 5,725,448 | A | * | 3/1998 | Kato et al. | 474/43 |
| 5,857,267 | A | * | 1/1999 | Cerny | 29/892.11 |
| 5,979,203 | A | * | 11/1999 | Radocaj | 72/71 |
| 6,209,191 | B1 | * | 4/2001 | Tabuchi et al. | 29/602.1 |
| 6,348,020 | B2 | * | 2/2002 | Hodjat et al. | 474/166 |
| 2004/0178398 | A1 | * | 9/2004 | Miller et al. | 254/390 |

FOREIGN PATENT DOCUMENTS

JP          58152967 A  *  9/1983 ............ F16H/55/00

* cited by examiner

Primary Examiner—Essama Omgba
(74) Attorney, Agent, or Firm—Paul E Milliken; Ray L Weber

(57) ABSTRACT

A pulley and bearing assembly and a method of inserting and fastening a bearing within a pulley having an axially extending cylindrical hub portion with an axial bore forming an inner periphery of the pulley and a pair of opposite ends, an annular belt groove portion around an outer periphery of the pulley and annular disk shaped body portion extending radially between the hub and belt groove portion, the steps comprising: clamping the pulley in a fixed axial position, providing a bearing of a slightly larger outside diameter than the inside diameter of the bore of the hub, axially aligning the bearing with the bore of the hub, applying axial pressure to one side of the bearing to move it into the bore in a force fit therewith, and applying axial pressure simultaneously to both ends of the hub to crimp the ends of the hub around the bearing near its circumference to retain the bearing within the hub. An apparatus for performing the above described method is a vertical press having an annular crimping tooling assembly carried by the press and having upper and lower parts which are moved axially by the press to grip the pulley and insert the bearing in the hub of the pulley and crimp the hub around the bearing. An alternative to crimping the hub around the bearing, is the application of a layer of adhesive to one or both of the contacting surfaces of the bearing and the bore of the hub before inserting the bearing into the hub.

4 Claims, 5 Drawing Sheets

US 6,941,651 B2

PULLEY AND BEARING ASSEMBLY AND A METHOD AND APPARATUS FOR INSERTING AND FASTENING A BEARING WITHIN A PULLEY

FIELD OF THE INVENTION

This invention relates generally to a pulley and bearing assembly and to inserting and fastening a bearing within a pulley and in particular to crimping hub flanges of a pulley around a bearing by means of a special crimping tooling mounted in a vertical press.

BACKGROUND OF THE INVENTION

Various means have been used in the past to fasten a bearing into the hub of a pulley or other rotary object which has been formed by splitting a circular disk and spin forming the blank into a pulley shape. A separate bearing housing is then attached to the pulley by welding staking or the like. The bearing housing is formed as two cup shaped housing which are fastened together by welding, rivets or the like to hold the bearing in place. Another means of fastening a bearing in a pulley is shown in U.S. Pat. Nos. 3,758,930 and 3,828,619 both of which are issued to Charles C Frost et al. In both these patents, a pulley is formed by typical metal splitting techniques having a central hub for receiving a bearing. The hub is formed with two axially extending annular flanges, with one being crimped radially inwardly at the same time it is formed as shown in FIG. 4 of the '930 patent to retain one side of a bearing when inserted into the hub, and the other axial flange formed extending straight axially outwardly, then later crimped around the bearing in a separate operation.

It has been found, however, that crimping each of the flanges in two separate operations does not provide as tight a fit around the bearing as when the flanges are crimped simultaneously after press fitting the bearing into the hub, since there is less area of surface contact between the hub and the bearing as shown in FIGS. 6 and 7 of the '930 patent where it can be seen that there is no surface contact between the outer circumference of the bearing except where it is crimped around the outer circumferential corners of the bearing. The angle formed by the split between the hub flanges of the '930 patent allows the flanges to bend and open up upon continued use of the bearing and hub assembly. This causes the bearing to become loose and wobbly within the hub.

In contrast to the '930 patent, in the present invention, as shown in FIGS. 5 and 6 of this application, there is about 80% surface contact between the outside circumference of the bearing and the inside circumference of the hub flanges. Since the hub flanges extend axially straight until the crimped ends there is less separation of the hub flanges upon use of the bearing and less likelihood of loosening of the bearing within the hub.

In U.S. Pat. No. 5,979,203 issued to Mijo Radocaj, the present inventor has invented a machine for splitting and spin forming a disk blank into a pulley having a hub which is particularly useful in carrying out the steps of the present invention.

OBJECTS OF THE INVENTION

Accordingly it is an object of the present invention to provide a method and apparatus of inserting and fastening a bearing within the hub of a pulley which provides a maximum amount of surface contact between the bearing and the hub of a pulley.

Another object of the invention is to provide a method for rapidly inserting and fastening a bearing within a hub of a pulley by press fitting the bearing into the hub and simultaneously crimping the axial flanges of the hub around the bearing to securely retain the bearing in the hub.

These and other objects of the invention can be readily understood by referring to the following specification and drawings.

SUMMARY OF THE INVENTION

This invention is a pulley and bearing assembly and a method of inserting and fastening a bearing within a pulley having an axially extending cylindrical hub portion with an axial bore forming an inner periphery of the pulley and a pair of opposite ends, an annular belt groove portion around an outer periphery of the pulley and annular disk shaped body portion extending radially between the hub and belt groove portion, the steps comprising: clamping the pulley in a fixed axial position, providing a bearing of a slightly larger outside diameter than the inside diameter of the bore of the hub, axially aligning the bearing with the bore of the hub, applying axial pressure to one side of the bearing to move it into the bore in a force fit therewith, and applying axial pressure simultaneously to both ends of the hub to crimp the ends of the hub around the bearing near its circumference to retain the bearing within the hub.

DETAILED DESCRIPTION OF THE INVENTION

Figure 1:
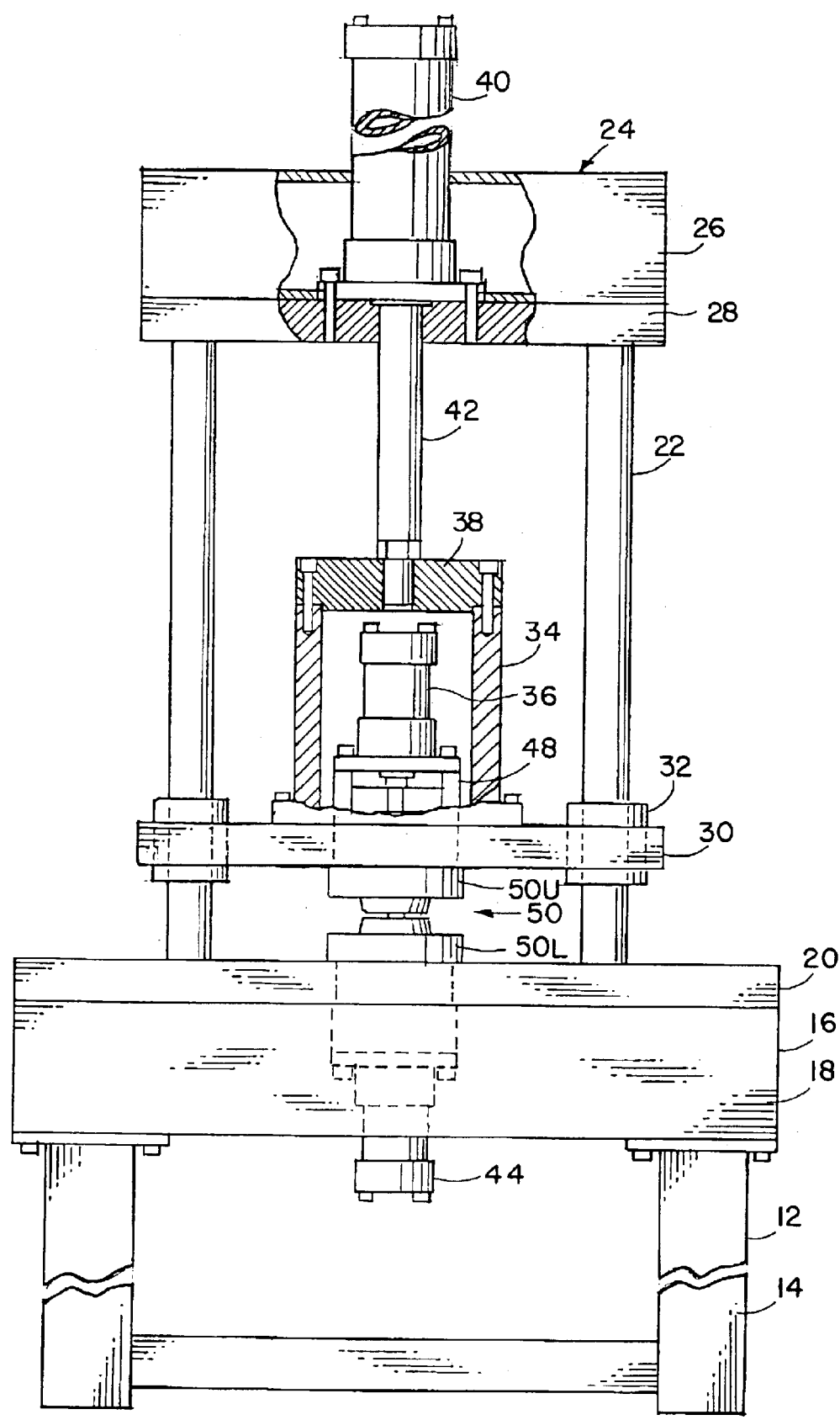
FIG. 1 is a front elevational view of a vertical press having a crimper assembly of the invention mounted therein for inserting and fastening a bearing within a pulley.

Referring now to the drawings as shown in FIG. 1, an upright hydraulic press indicated generally by the numeral 10, having a table base 12, having four vertical legs 14, on top of which is fastened a bottom plate assembly 16 having hollow rectangular support beams 18 and a thick solid metal plate 20 attached to the top of the beams 18.

Four round crimper columns or posts 22 attached by screws to the plate 20 extend vertically upwardly and are attached by screws to a top plate assembly 24, having hollow rectangular support beams 26 and a thick solid metal plate 28 fastened to the bottom of the beams 26.

It should be mentioned that various parts of the press 10 and the tooling carried thereby are attached together by various sizes of machine screws which are shown in the drawings but will not be given numerals for the sake of simplicity in the specification.

A ram plate 30 having four bearings 32 extending therethrough, is mounted between the top plate assembly 24 and the bottom plate assembly 16 with one of the columns 22 extending through one of the bearings 32 to permit the ram plate 30 to be moved up and down on the columns 22 between the top plate assembly 24 and the bottom plate assembly 16.

A cylinder spacer tube 34 surrounding a middle cylinder 36 extends vertically upwardly from the ram plate 30 and is connected to a cylinder support plate 38.

An upper cylinder 40 mounted vertically on the top plate 24 has a piston rod 42 extending downwardly therefrom and having its lower end connected to the cylinder support plate 38. When the piston rod 42 is moved up and down by the cylinder 40, it also moves the cylinder support plate 38, the cylinder spacer tube 34, the ram plate 30 and anything connected thereto.

A lower cylinder 44 is attached through a pair of cylinder mounting blocks 46 to the plate 20 of the bottom plate assembly 16.

In a similar manner the middle cylinder 36 is attached through a pair of cylinder mounting blocks 48 to the ram plate 30.

A crimper assembly 50 having an upper portion 50U and a lower portion 50L are mounted between the ram plate 30 and the bottom plate assembly 16, with the upper portion 50U being attached to the ram plate 30 and the lower portion 50L being attached to the bottom plate assembly 16.

The bottom plate assembly 16 and the lower portion 50L of the crimper assembly 50 remains in a fixed position while the upper portion 50U and the ram plate can be moved vertically up and down by the piston rod 42 of the upper cylinder 40.

Figure 2:
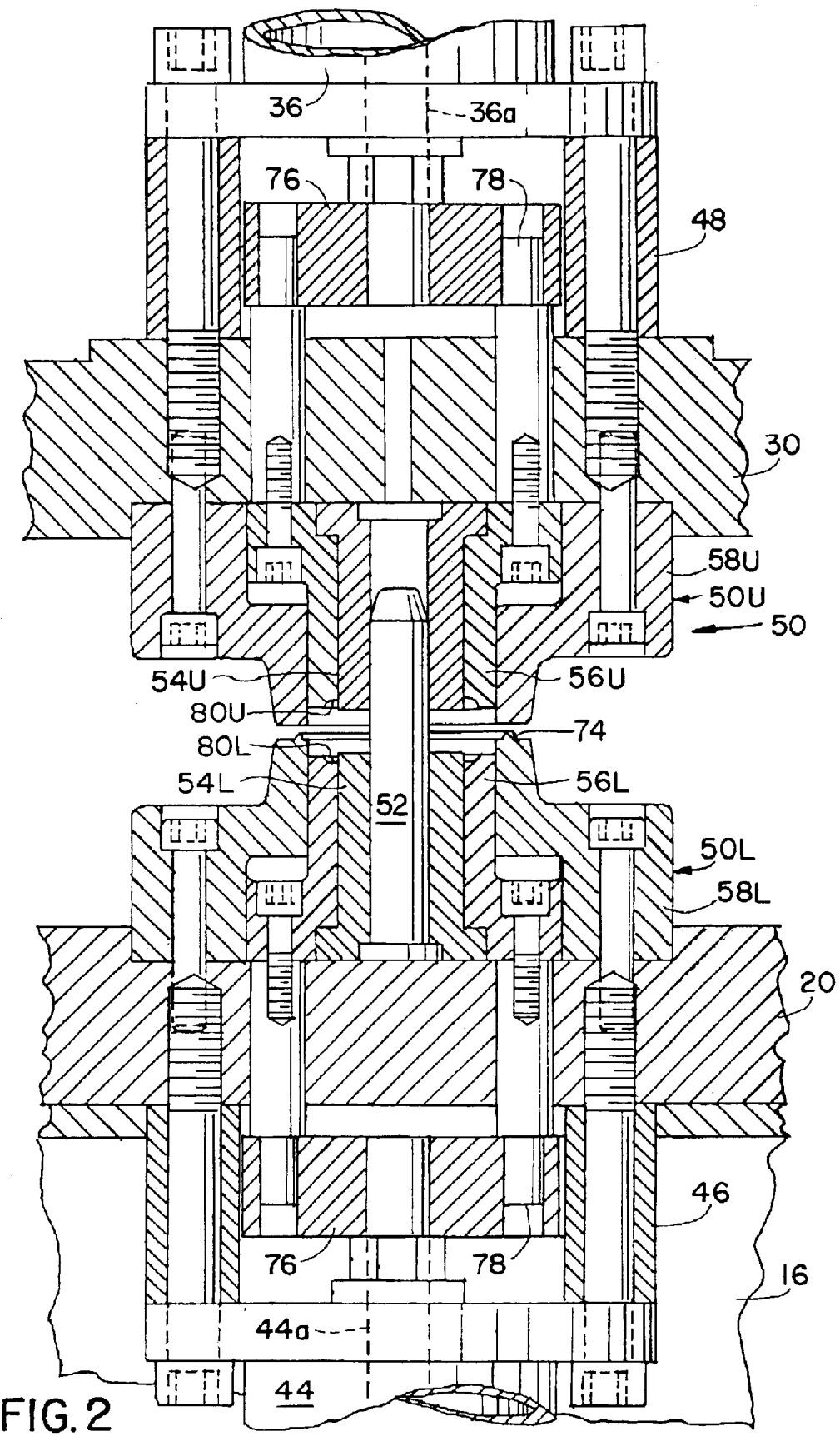
FIG. 2 is an enlarged cross sectional view of the crimper assembly of FIG. 1.

The working parts of the crimper assembly 50 are shown in more detail in FIG. 2. A pilot pin 52 lies along the center axis of the assembly 50. A hollow center post 54 consisting up an upper part 45U and a lower part 54L surrounds the pilot pin 52. An annular crimper tool 56 having an upper part 56U and a lower part 56L surrounds the center post. An annular crimper base 58 having an upper part 58L and a lower part 58L surrounds the crimper tool 56. The upper part 58U is attached to the ram plate 30 with screws and the lower part 58L is attached to the plate 20 with similar screws.

Figure 3:
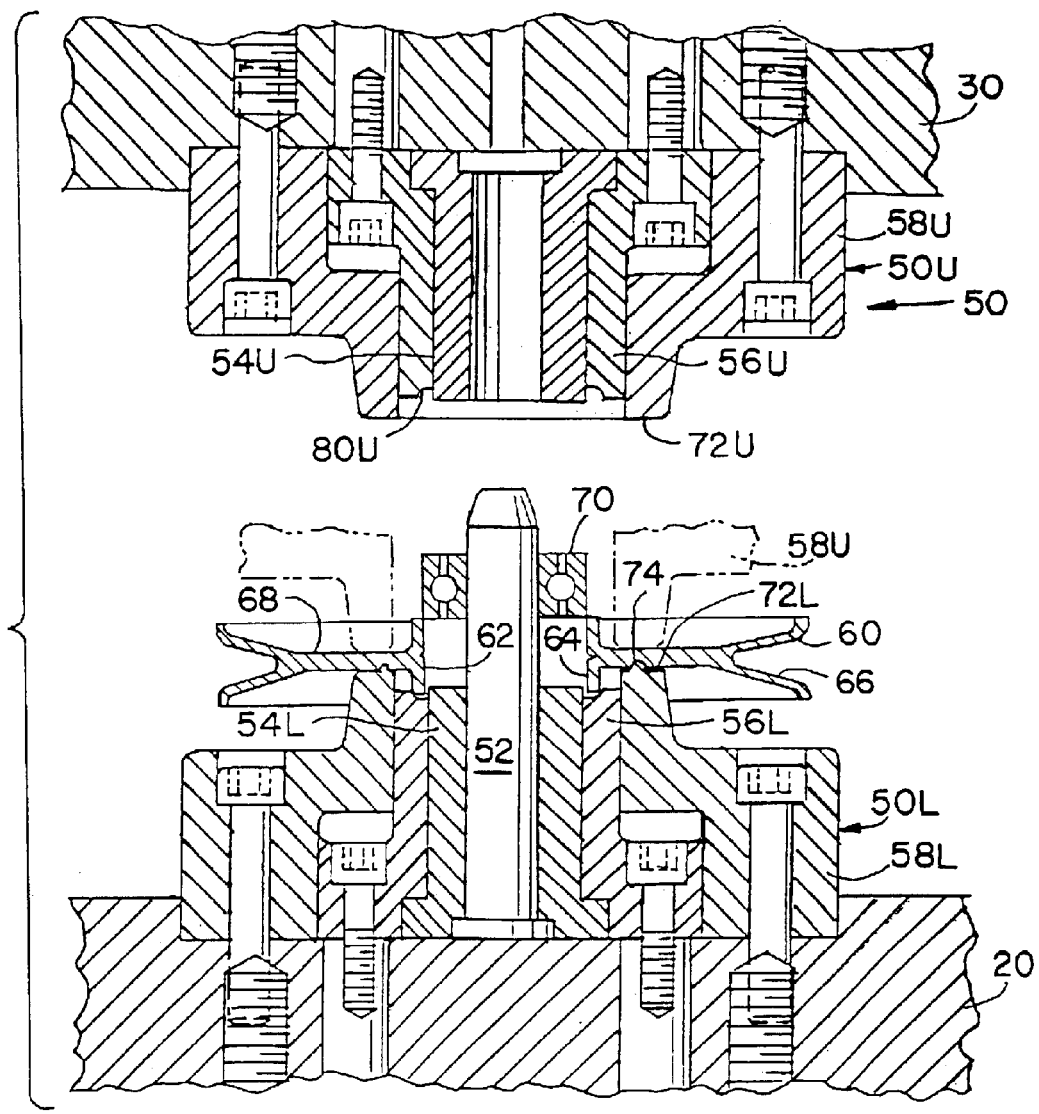
FIG. 3 is a fragmentary cross sectional view of the crimper assembly of FIG. 2 with an upper and lower portion of the crimper assembly axially separated from each other to permit positioning of a pulley and bearing therebetween.

It can be seen in FIG. 3 that as the ram plate 30 is moved upwardly by retraction of the piston rod 42 into the cylinder 40, the upper portion 50U is moved a spaced distance away from the lower portion 50L to leave room to place a pulley 60 on top of the lower part 58L of the base 58 and with the pilot pin 52 protruding upwardly through an axial hole 62 of a center hub 64 of the pulley 60.

The pulley also has an annular "V" shaped belt groove portion 66 around the outer periphery of the pulley and a disk shaped body portion 68 connected between the belt groove 66 and the hub 64. The hub 64 has flanges 64a and 64b extending axially outwardly from each side of the body portion 68.

The pilot pin 52 extends upwardly through the hole 62 and above the upper edge of the hub 64 to receive a bearing 70 thereon which rests at the upper edge of the hub 64 from where it is inserted into the hole 62 of the hub 64. The lower base part 58L has an upwardly facing gripping surface 72L containing an annular alignment rib 74 extending upwardly therefrom. One face of the body portion 68 of the pulley 60 has an annular alignment groove 75.

Figure 3A:
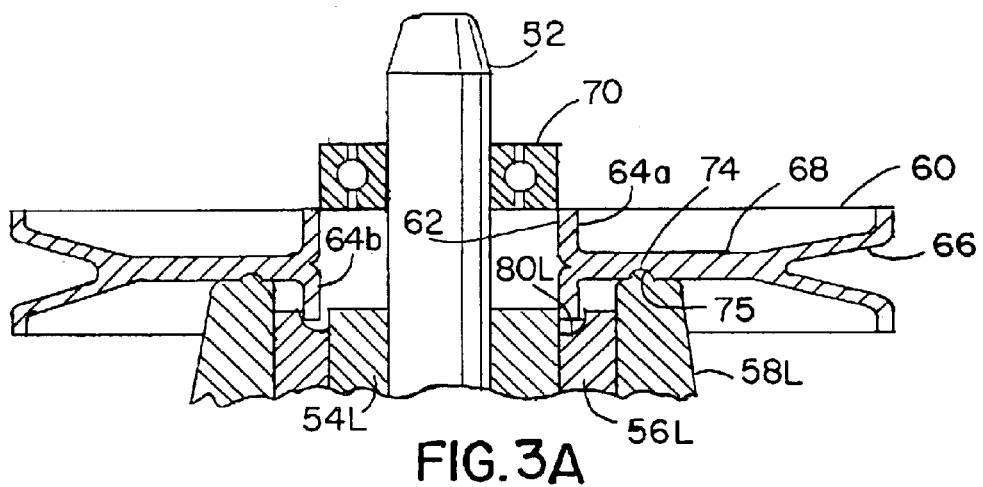
FIG. 3A is an enlarged fragmentary view of a portion of the crimper assembly and pulley with an alignment rib and a corresponding alignment groove for axially centering the pulley on the crimper assembly.

An enlarged view of the alignment rib 74 and the alignment groove 75 in the body portion 68 are shown in FIG. 3A.

The pulley 60 is positioned on the lower base part 58L so that the groove 78 is facing downwardly to engage the alignment rib 74 and thereby center the pulley with respect to the pilot pin 52. This then results in the bearing 70 being centered over the hole 62 through the hub 64 to position the bearing 70 for insertion into the hub 64.

The upper base part 58U has a downwardly facing gripping surface 72U positioned above the gripping surface 72L on the lower base part 58L. After the pulley 60 and the bearing 70 are placed in axial alignment on the pilot pin 52, the upper base part 58U is moved downwardly, as shown by the chain dotted line in FIG. 3, by downward movement of the ram plate 30 by the upper cylinder 40 to clamp the body portion 68 of the pulley 60 between the gripping surfaces 72U and 72L. Simultaneously the upper part 54U of the center post 54 is moved downwardly by the ram plate 30 to force the bearing 70 into the hole 62 of the hub 64.

Figure 4:
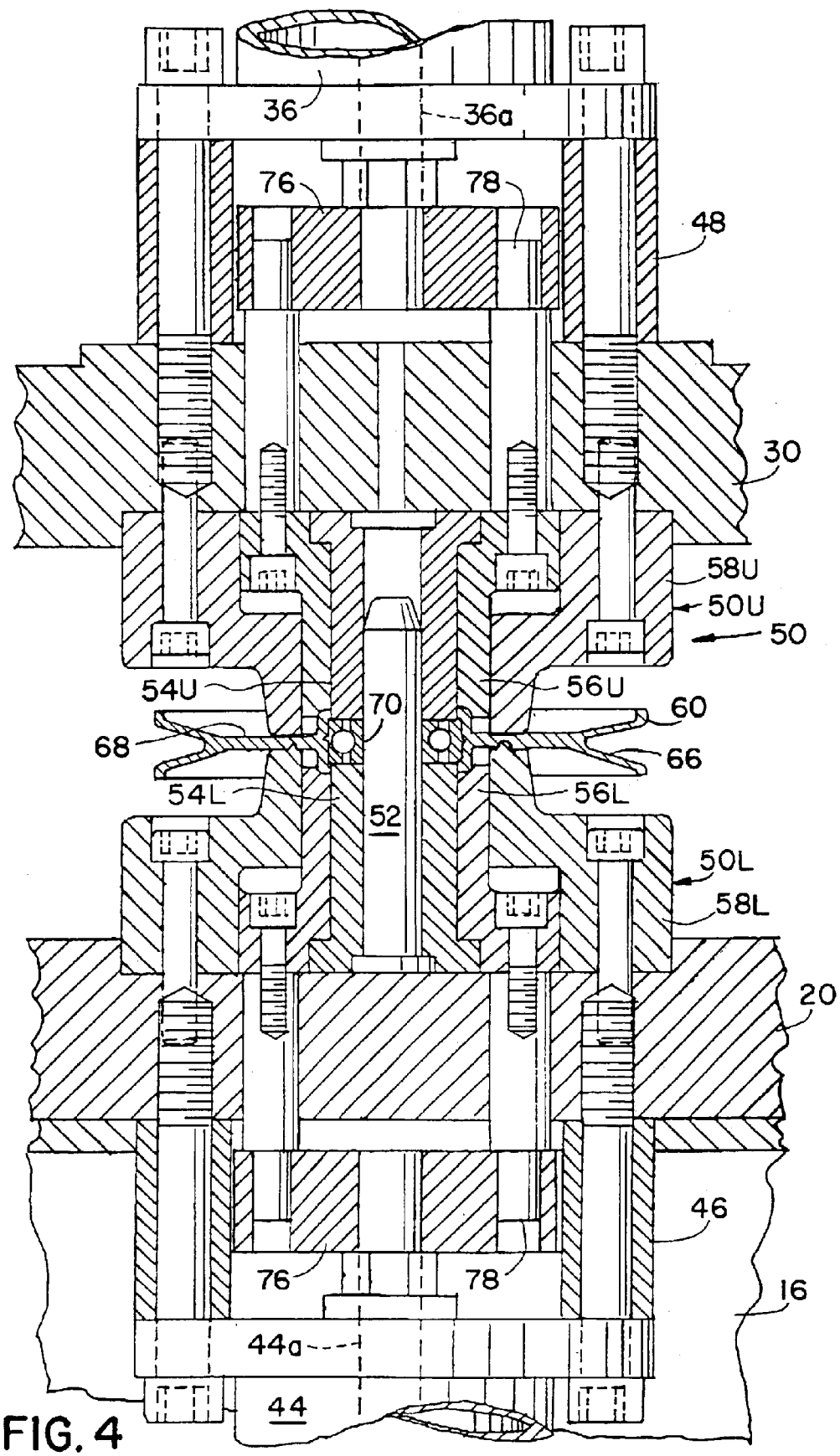
FIG. 4 is a fragmentary cross sectional view of the crimper assembly of FIG. 2 after the upper and lower portions of the crimper assembly have been moved axially toward each other to insert the bearing in the pulley and simultaneously crimp the opposite flanges of the hub of the pulley around the corners of the bearing to retain it in position within the hub.
Figure 5:
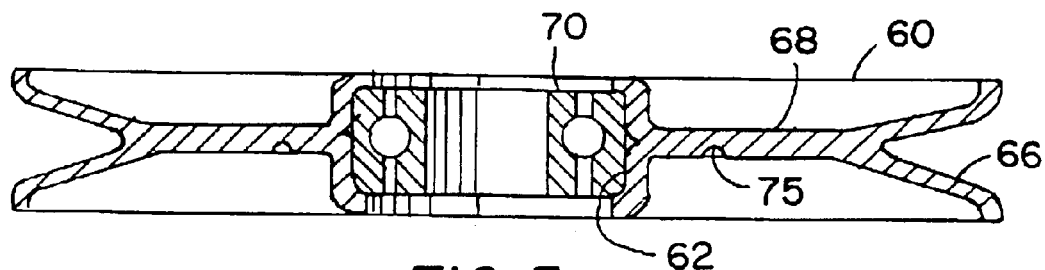
FIG. 5 is a cross sectional view of a pulley with a bearing crimped within the hub of the pulley having a "V" shaped belt engaging groove portion.

Once the body portion 68 is firmly gripped between gripping surfaces 72U and 72L, and the bearing 70 is positioned within the hub 64, the cylinders 36 and 44 are actuated simultaneously so that the piston rods 36a and 44a move the cylinder blocks 27 and the cylinder spacer standoffs 78 axially inwardly with respect to the hub 64 to move the upper and lower portions 56U and 56L of the crimper tool 56 axially inwardly so that the curved annular crimping recesses 80U and 80L contact the outer edges of the hub flanges 64a and 64b and crimp the flanges around the outer peripheral corners of the bearing 70 and securely fasten the bearing within the hub 64 of the pulley 60 as shown in FIGS. 4 and 5.

The pulley 60 with the hub 64 is normally formed by splitting and spin forming a disk blank into a pulley as described in my prior U.S. Pat. No. 5,979,203 and the hub can be formed with the axial hole 62 formed to be of such a diameter that the bearing 70 is in a force fit when inserted into the hole. In order to provide a desired close tolerance of the hole 62 with respect to the bearing, the hole 62 can be bored after spin forming. By providing such a close tolerance for the force fit of the bearing 70, and the simultaneous crimping of two outer edges of the hub flanges 64a and 64b, this results in a larger area of close surface contact between the bearing and the hub flanges 64a and 64b and less chance of the bearing 70 loosening in the hole 62 when the pulley is subjected to continued use over a period of time.

Figure 6:
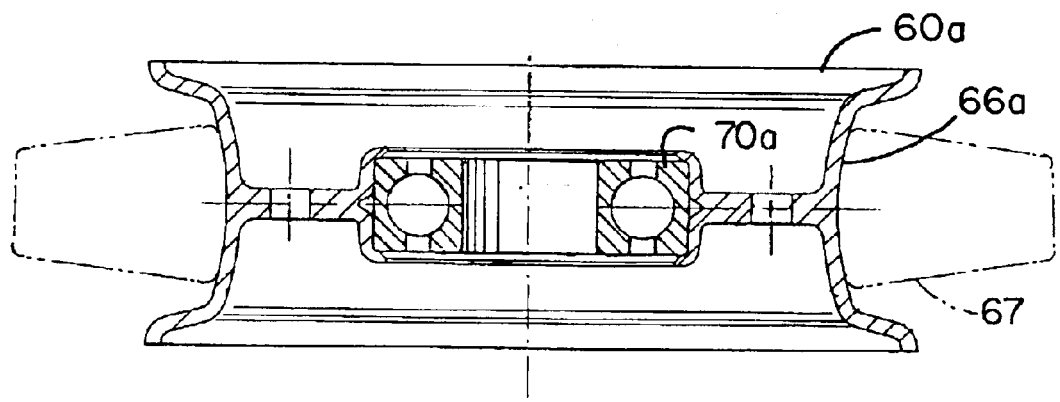
FIG. 6 is a cross sectional view of a pulley with a bearing crimped with the hub of the pulley and having an annular belt engaging groove portion with a concave cross section.

An alternative to the "V" shaped pulley groove 66 is show in FIG. 6 in which a pulley 60a assembled with a bearing 70a has a concave pulley groove 66a which engages a belt 67 show by a chain dotted line. The pulley 60a is an idler pulley and is normally mounted to be biased against the outer or top surface of a "V" belt to maintain tension on the belt as it passes around other pulleys (not shown). The concave surface of the groove 66a is curved to match the curvature of the top side of the belt and retain it in the center of the pulley groove. This prevents the belt from creeping sideways against side flanges of the pulley groove and causing the sides of the belt to wear.

Figure 7:
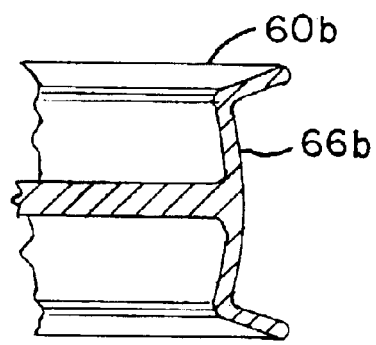
FIG. 7 is a fragmentary cross section of a belt engaging groove portion of a pulley similar to the pulley of FIG. 6 but the belt groove portion having a convex cross section.

FIG. 7. shows another alternative pulley 60b having a convex surface in the bottom of a pulley groove 66b.

Figure 8:
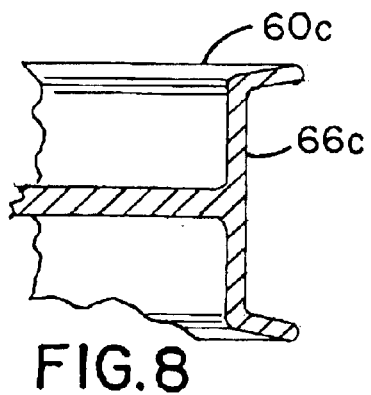
FIG. 8 is a fragmentary cross section of a belt engaging groove portion of a pulley similar to the pulley of FIG. 6 but the belt groove portion having a flat cross section.

FIG. 8. shows another pulley 60c having a flat surface in the bottom of a pulley groove 66c.

All the pulleys shown in FIGS. 5 through 8 can be assembled and fastened with a bearing therein in the same manner as described by press fitting the bearing and crimping the outer edges of the pulley hub around the corners of the bearing.

As an alternative to crimping the outer edges of the pulley hub around the bearing, a layer of adhesive can be applied to one or both contacting surfaces of the hub and/or bearing prior to inserting the bearing in press fit within the hub. Various types of adhesives can be used to bond the bearing to the hub so long as it provides the strength of bond required and will withstand the amount of heat generated by rotation of the pulley. One suitable adhesive which can be used is a quick setting cyanoacrylate adhesive, produced by Loctite Corporation and sold under the Registered Trademark, 380 BLACK MAX®.

When a bearing is inserted in a press fit into a pulley hub with adhesive bonding the parts together, the hub and bearing would appear the same as the pulleys shown in FIGS. 5 and 6, except that the ends of the hub would not be crimped around the pulley, but would remain axially extended as shown in FIG. 3a even after the bearing is inserted therein. In such instance crimper tools such as 56U and 56L shown in FIGS. 3 and 4 are not needed.

While a typical tooling arrangement is shown herein for inserting and fastening a bearing within a pulley it should be understood that other variations of the assembly of the tooling can also be used without departing of the scope of the invention.

What is claimed is:

1. A method of inserting and fastening a bearing within a pulley having an axially extending cylindrical hub portion with an axial bore forming an inner periphery of the pulley and a pair of opposite ends, an annular belt groove portion around an outer periphery of the pulley and annular disk shaped body portion extending radially between the hub and belt groove portion, the steps comprising:

clamping the pulley in a fixed axial position between pair of axially aligned annular jaws;

providing a bearing of a slightly larger outside diameter than the inside diameter of the bore of the hub;

placing the bearing on a pilot pin extending through the axial center of the bore of the hub, thereby axially aligning the bearing with the bore of the hub, applying axial pressure to one side of the bearing to move it into the bore in a force fit therewith; and applying axial pressure simultaneously to both ends of the hub by means of two axially movable annular crimping members to crimp the ends of the hub around the bearing near its circumference to retain the bearing within the hub.

2. The method of claim 1, wherein the pulley is formed by splitting inner and outer circumferences of a disk, swaging the outer split circumference of the disk to form a bolt groove portion and swaging the inner split circumference to form the hub of the pulley with the axial bore therethrough.

3. The method of claim 2, wherein the swaged axial bore in the hub is bored with a cutting tool to further enlarge the inside diameter of the bore to a predetermined diameter which is slightly smaller that the outside diameter of the bearing to be mounted within the hub.

4. The method of claim 1, wherein the steps of fastening the bearing in the pulley are carried out in a hydraulic press having tooling for retaining the pulley, inserting the bearing axially Into the hub of the pulley and crimping the ends of the hewing around the pulley.

* * * * *